United States Patent [19]
Winner

[11] Patent Number: 6,026,353
[45] Date of Patent: Feb. 15, 2000

[54] METHOD AND APPARATUS FOR RECOGNIZING A VERTICAL MISALIGNMENT OF A CLEARANCE SENSOR

[75] Inventor: Hermann Winner, Karlsruhe, Germany

[73] Assignee: Robert Bosch GmbH, Stuttgart, Germany

[21] Appl. No.: 08/984,718

[22] Filed: Dec. 3, 1997

[30] Foreign Application Priority Data

Dec. 7, 1996 [DE] Germany ............................ 196 50 863

[51] Int. Cl.$^7$ ..................................................... G01S 13/88
[52] U.S. Cl. ................................. 702/183; 702/94; 342/70
[58] Field of Search ..................... 702/94, 183; 701/301, 701/23, 96; 342/70, 73, 74, 75

[56] References Cited

U.S. PATENT DOCUMENTS

| | | | |
|---|---|---|---|
| 5,134,411 | 7/1992 | Adler | 342/130 |
| 5,410,346 | 4/1995 | Saneyoshi et al. | 348/116 |
| 5,598,163 | 1/1997 | Cornic et al. | 342/70 |
| 5,790,403 | 8/1998 | Nakayama | 364/424.033 |
| 5,839,096 | 11/1998 | Lyons et al. | 702/183 |
| 5,923,125 | 7/1999 | Endo | 315/82 |
| 5,929,802 | 7/1999 | Russell et al. | 342/70 |

FOREIGN PATENT DOCUMENTS

| | | |
|---|---|---|
| 33 34 033 | 4/1985 | Germany. |
| 2 052 204 | 1/1981 | United Kingdom. |
| 2 195 509 | 4/1988 | United Kingdom. |
| 2 196 183 | 4/1988 | United Kingdom. |

OTHER PUBLICATIONS

Winner et al., "Adaptive Cruise Control System Aspects and Development Trends", SAE 961010, Feb. 26–29, 1996 (presented at SAE 1996 in Detroit).

*Primary Examiner*—Patrick Assouad
*Attorney, Agent, or Firm*—Kenyon & Kenyon

[57] ABSTRACT

A method and an apparatus on the basis of which a vertical misadjustment or misalignment of a clearance sensor, which is installed in or on a motor vehicle, can be recognized. Pitch motions of the motor vehicle are determined, for example via sensors, in the form of pitch angles, and are correlated in an analysis and control device with data and/or signals which were generated or prepared by the clearance sensor, and which contain the target detections or target detection losses.

11 Claims, 4 Drawing Sheets

METHOD AND APPARATUS FOR RECOGNIZING A VERTICAL MISALIGNMENT OF A CLEARANCE SENSOR

FIELD OF THE INVENTION

The present invention relates to a method and an apparatus for recognizing a vertical misadjustment or misalignment of a clearance sensor, in particular a radar sensor, which is mounted on or in a motor vehicle. In the context of the present invention, the term "misalignment" is hereinafter understood to mean any misadjustment or misalignment of either a part or the entire clearance sensor, which causes a failure in the transmission or reception of the measuring radiation emitted or received by the clearance sensor.

BACKGROUND INFORMATION

Numerous publications—for example, "Adaptive Cruise Control System Aspects and Development Trends" by Winner et al., SAE 961010, presented at SAE 1996 in Detroit—describe equipping motor vehicles with a clearance sensor. A clearance sensor of this kind can be implemented, for example, as a radar sensor, laser sensor, or infrared sensor, and serves to detect obstacles which are located in the path of the vehicle. Usually, at least one distance between the obstacle and the motor vehicle is also determined. Such sensors are used as simple obstacle or clearance warning devices, and also in the context of intelligent or adaptive cruise control (AICC or ACC) systems in which the speed of a regulated vehicle is automatically adapted to the speed of any vehicles traveling ahead of it. A further application for such sensors is the monitoring or observation of a region of space as a lane-changing aid.

All these applications have in common the fact that the clearance sensor used must be accurately aligned, so that its "direction of view" matches a direction being monitored. This matching requirement applies equally to both horizontal and vertical alignment. If a clearance sensor of this kind is intended to be capable of detecting an azimuthal direction of detected targets in addition to mere detection, the clearance sensor must have a high-resolution radiation characteristic in the azimuthal plane. This means that the horizontal alignment must be performed very precisely and accurately, and yet offer a simple yet precise method for checking the horizontal alignment; for example with reference to a known reference target and utilizing the sensor's own directional analysis system.

In contrast, the requirements for the accuracy of a vertical alignment are generally not so stringent. However, due to the limited transmission power available with such clearance sensors, the vertical radiation characteristic is also made as narrow as possible with reasonable effort. As a result, the vertical alignment must also be very accurate. If the clearance sensor, for example, radiates a transmitted signal at too steep an angle, i.e., too high, targets that might be in the path of the vehicle will not be illuminated by that radiation and accordingly will not be detected. Obstacles may also not be accurately detected if the clearance sensor radiates too low, i.e., toward the ground.

Conventional methods for checking a vertical alignment of a clearance sensor of this kind are based on a stationary measurement of the overall radiation characteristic of the clearance sensor in which a reference target (e.g., a reflector, or a measurement receiver) is positioned at a desired height opposite the clearance sensor. The clearance sensor is then aligned vertically in such a way that it illuminates the reference target or measurement receiver with a maximum transmission power. The principal disadvantage of this method is that a complex measurement structure is needed to merely check the alignment. A horizontal misalignment of the clearance sensor can be recognized, with a high probability, by the erroneous angle of the targets. However, in the case of a vertical misalignment, no targets are detected if the sensor is set too high or too low. Therefore, it is possible that a vertical misadjustment will not recognized in some situations.

SUMMARY OF THE INVENTION

The present invention provides a method and an apparatus with which a vertical misalignment of a clearance sensor can be easily and reliably recognized. In particular, this recognition is also intended to be possible during operation of the clearance sensor, i.e. without a complex external measurement structure.

According to embodiments of the present invention, this is achieved by correlating the pitch motions of the motor vehicle with data and/or signals which have been generated and/or prepared by the clearance sensor, and which contain target detections D and/or target detection losses DV for said recognition. And as a function of the result of this correlation, a signal or identifier is generated, on the basis of which any misalignment of the clearance sensor can be recognized.

An advantage of the method according to the present invention is that a vertical misalignment of a clearance sensor can be recognized easily, i.e. without a complex external measurement structure, and also, in particular, during operation of the clearance sensor. According to a preferred embodiment of the present invention, it is also possible to recognize in which direction the clearance sensor is vertically misaligned, i.e. too high or too low.

DETAILED DESCRIPTION

Figure 1:
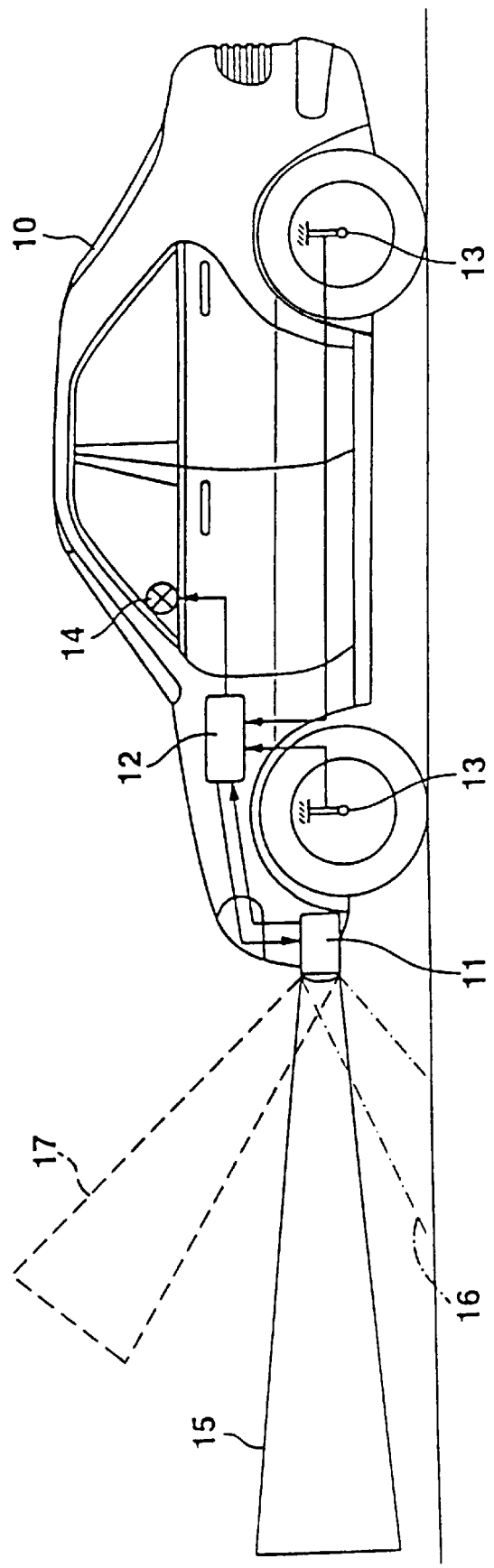
FIG. 1 shows a motor vehicle with the vertical beam directions of a clearance sensor.

FIG. 1 shows a side view of a motor vehicle 10 with a clearance sensor 11 installed on its front, with three approximately lobe-shaped propagation characteristics 15, 16, 17 emitting from clearance sensor 11. They indicate the principal propagation directions of radiation emitted from clearance sensor 11. Propagation characteristic 15 extends almost horizontally in the direction of travel of motor vehicle 10 and symbolizes a desirable propagation characteristic which results when clearance sensor 11 is correctly aligned vertically. Propagation characteristics 16 and 17, on the other hand, indicate a misalignment of clearance sensor 11. According to propagation characteristic 16, radiation generated by the clearance sensor would radiate too low, i.e. almost directly against the ground. According to propagation characteristic 17, radiation emitted from the clearance sensor would be radiated too high, i.e. up into the air. In both cases, obstacles that are located in the direction of travel in front of motor vehicle 10 would not be illuminated by the emitted radiation and would therefore not be correctly detected. Radiation characteristics 15 to 17 thus illustrate, in an exaggerated depiction, the need for accurate vertical alignment of a clearance sensor 11.

An analysis and control device 12, which is also located in motor vehicle 10, is connected bidirectionally to clearance sensor 11. A spring compression travel sensor 13 is shown at each of the wheels of motor vehicle 10. These are conventional sensors used in headlight aiming or level control system for motor vehicles, and are described, for example, in German Patent No. 33 34 033.

Each of sensors 13 is connected via a signal line to analysis and control unit 12. A signaling device 14, for example a fault light, is also connected to analysis and control device 12.

Figure 2:
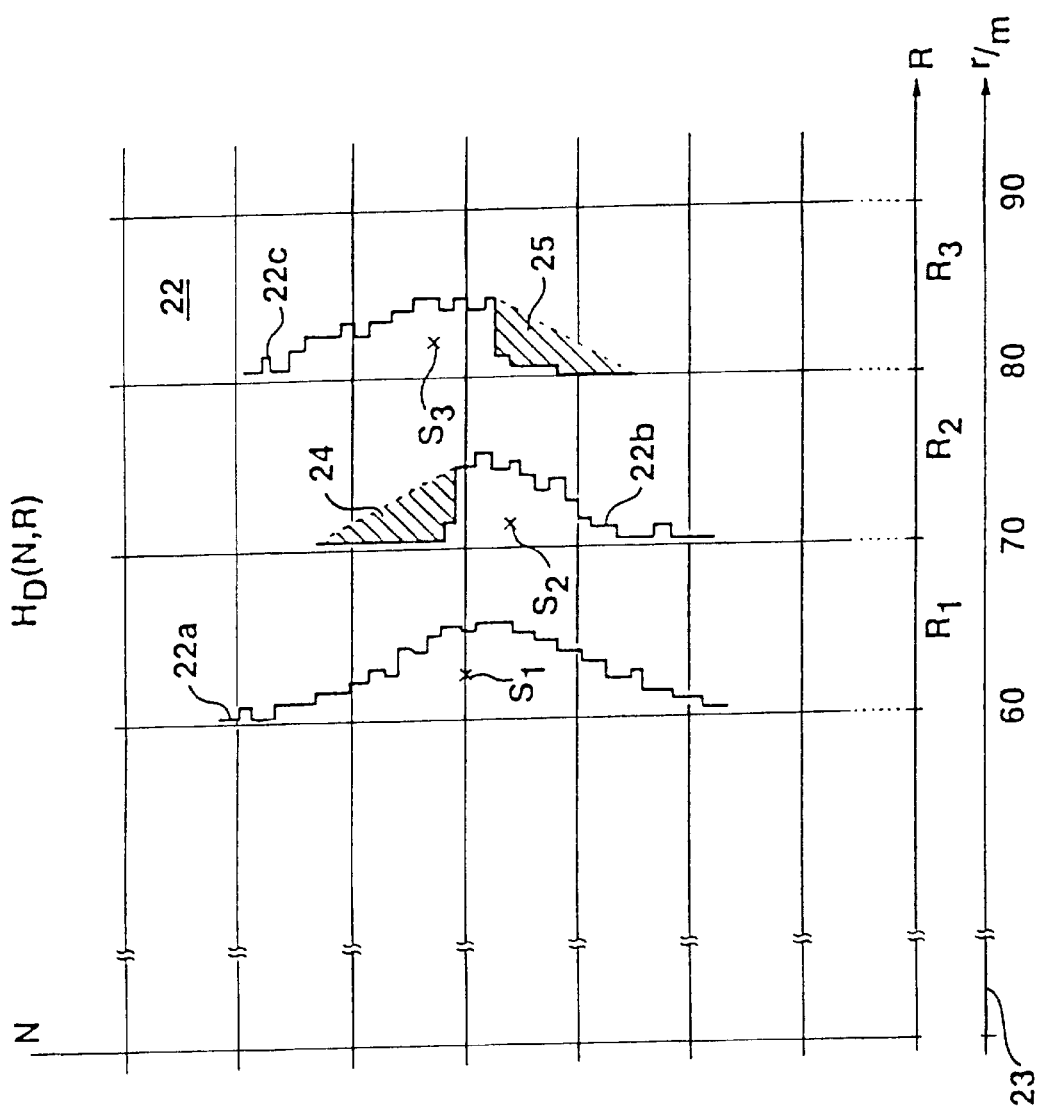
FIGS. 2a and 2b show frequency diagrams for pitch angles and target detections D or target detection losses DV.

FIGS. 2a and 2b show schematic drawings of frequency distributions which forms the basis for the method according to the present invention. The two figures are drawn next to one another to illustrate the similarities and differences between the two distributions. FIG. 2a shows, by way of example, a Gaussian frequency distribution $H_N(N)$ 20 of the occurrence of the pitch angle n of a motor vehicle 10. These pitch angles, or a magnitude corresponding to them, can, for example, be determined by means of spring compression travel sensor 13. They are then transferred into frequency distribution $H_N(N)$ preferably constituting a histogram corresponding to pitch angle intervals N. S indicates a center point or mean of frequency distribution $H_N(N)$ which, in the example assumed here, lies on the zero-degree axis of pitch angle intervals N.

In FIGS. 2a and 2b, the range of pitch angles that occur, and also the magnitude of the individual pitch angle intervals N, should all be understood as examples. In particular, a frequency distribution as wide as the one sketched here will actually occur only in the case of a logarithmic division of the ordinates of the coordinate systems. Actual values may deviate from the values cited here depending on the model of motor vehicle used and/or an individual implementation.

In contrast to the usual depiction, abscissa 21 of frequency distribution $H_N(N)$, i.e. the axis which designates the pitch angle intervals N, is drawn vertically. The reason will become evident with reference to FIG. 2b adjacent thereto, in which a two-dimensional frequency distribution $H_D(N,R)$ is shown. The vertical axes in FIG. 2b also designate the pitch angle intervals N, and have divisions identical to that of FIG. 2a. The distances r which result between clearance sensor 11 and a detected obstacle are plotted on horizontal axis 23; the individual distances r are once again divided into distance intervals R according to a histogram. The overall result is thus a plane whose coordinates are constituted by pitch angle intervals N and distance intervals R. Frequency distributions 22a to 22c, for example, are schematically drawn within three distance intervals R1 to R3, also taken as examples. In visual terms, these frequency distributions would need to rise vertically from the plane of the paper, resulting in a three-dimensional "mountain range."

The combined frequency distribution $H_D(N,R)$ thus shows the frequency of target detections D, i.e. how often clearance sensor 11 has detected an obstacle within a distance cell R and within a pitch angle interval N. The three schematically sketched frequency distributions 22a to 22c show three possible cases of such frequency distributions. In reality, however, they cannot occur in this fashion right next to one another, and are plotted on one diagram here only in order to simplify the depiction.

The combined frequency distribution 22a in distance cell R1 is assumed to be Gaussian, and its center point or mean S1 lies on the zero-degree axis of the pitch angle intervals N. The combined frequency distribution 22b in distance cell R2, on the other hand, is no longer entirely Gaussian. It originates, however, from a distribution that is originally assumed to be Gaussian, from which a region 24, marked by cross-hatching, has been "cut out." This frequency distribution corresponds to a situation in which, at positive pitch angles—i.e. at pitch angle intervals above the zero-degree axis—almost no further target detections D occur. An opposite case is shown by frequency distribution 22c in distance cell R3. Here there is a "cut-out" region 25, indicated by cross-hatching, at negative pitch angles n, in other words, almost no further target detections D occur at negative pitch angles. The two frequency distributions 22b and 22c just cited show, as will be explained in more detail below, cases in which there is obviously a misadjustment or misalignment of clearance sensor 11. S1 to S3 indicate the respective center points of the three frequency distributions 22a to 22c.

The basic idea of the method according to the invention is that a correlation must exist between the frequency of individually occurring pitch angles as shown by $H_N(N)$ and the frequency of target detections as shown by $H_D(N,R)$ If, for example, as sketched in distance cell R2, no target detections are present at positive pitch angles n, even though it is simultaneously evident from the frequency distribution $H_N(N)$ as shown in FIG. 2a that positive pitch angles have occurred with sufficient frequency, it may then be assumed that clearance sensor 11 is not correctly oriented or aligned. In this hypothetical case, clearance sensor 11 would be aligned too high, in accordance with radiation characteristic 17 from FIG. 1. This then means that targets can no longer be illuminated and detected if motor vehicle 10 is oriented with its front upward, i.e. if the front springs are extended. This upward orientation is referred to here, by way of example, as "positive pitch angles."

In the opposite case, which is shown by means of frequency distribution 22c in distance cell R3, clearance sensor 11 would be misaligned in such a way that its radiation characteristic 16 was too low. Possible obstacles would then accordingly no longer be illuminated and detected if the front of motor vehicle 10 was tilted downward, i.e. if the front springs compressed. This is referred to here, by way of example, as "negative pitch angles."

Frequency distribution 22a, however, which is sketched in distance cell R1, corresponds in its statistical properties approximately to frequency distribution $H_N(N)$, which is plotted in FIG. 2a and indicates the probability of occurrence of all pitch angles. This means that target detections occur to the same extent as the pitch angles correlated with them, and this agreement indicates that clearance sensor 11 is correctly aligned or oriented.

Before describing two exemplary embodiments of the method according to the present invention with reference to FIGS. 3 and 4, two possible methods for determining the pitch angle of vehicle 10 will first be discussed. A first possible method is shown in FIG. 1, in which spring compression travel sensors 13 supply data or signals to an analysis and control device 12. Such conventional spring compression travel sensors of this kind are used in automatic headlight aiming systems or automatic level regulation systems in motor vehicles. A headlight aiming system which uses a spring compression travel sensor of this kind is described, for example, in German Patent No. 33 34 033. In a headlight aiming system of this kind, predominantly slow changes in the pitch angle of vehicle 10 are analyzed.

However, in the context of the present invention, rapid changes in the pitch angle of vehicle 10 are needed for the analysis. This can be accomplished, for example, by placing a highpass filter or differentiating element downstream from the signal of spring compression travel sensors 13. As a result, only rapid changes in the signals of each spring compression travel sensor 13 are then forwarded to analysis and control unit 12.

A second possible method for determining the pitch angle n of motor vehicle 10 is to estimate it with reference to the vehicle-dynamics correlations of a motor vehicle. These correlations are described, for example, in "Dynamics of Motor Vehicles" (Dynamik der Kraftfahrzeuge), by M. Mitschke, published by SpringerVerlag in 1972. According to this publication, an instantaneous pitch angle n of a motor vehicle 10 can be determined from an instantaneously effective inertial force Fi and a constant k; the constant k contains properties characteristic of the vehicle, such as the height and location of the center of gravity, spacing between axles, suspension spring stiffness, etc. This constant k must be determined once for a particular vehicle model, and is then available as a parameter for estimation. The inertial force Fi is yielded by the following vehicle-dynamics equation:

$$Fi=Fa-FL-FR$$

where

Fi indicates the inertial force,

Fa the drive force of the motor vehicle,

FL the air resistance forces, and

FR the frictional forces affecting the motor vehicle.

The drive force Fa can be determined with conventional methods from an engine characteristics diagram, a transmission ratio, and a wheel radius of the motor vehicle. FL designates the air resistance forces, and FR represents the rolling resistance or frictional forces of the motor vehicle. These values can also be determined, approximately as constants, for a motor vehicle model, and are then available as parameters. In summary, the pitch angle n can thus be estimated from current vehicle-dynamics data such as engine speed and transmission ratio, and from parameters characteristic of the vehicle. Regardless of the manner in which they are determined, the individual pitch angles n are then associated with a frequency distribution $H_N(N)$ according to FIG. 2a.

Figure 3:
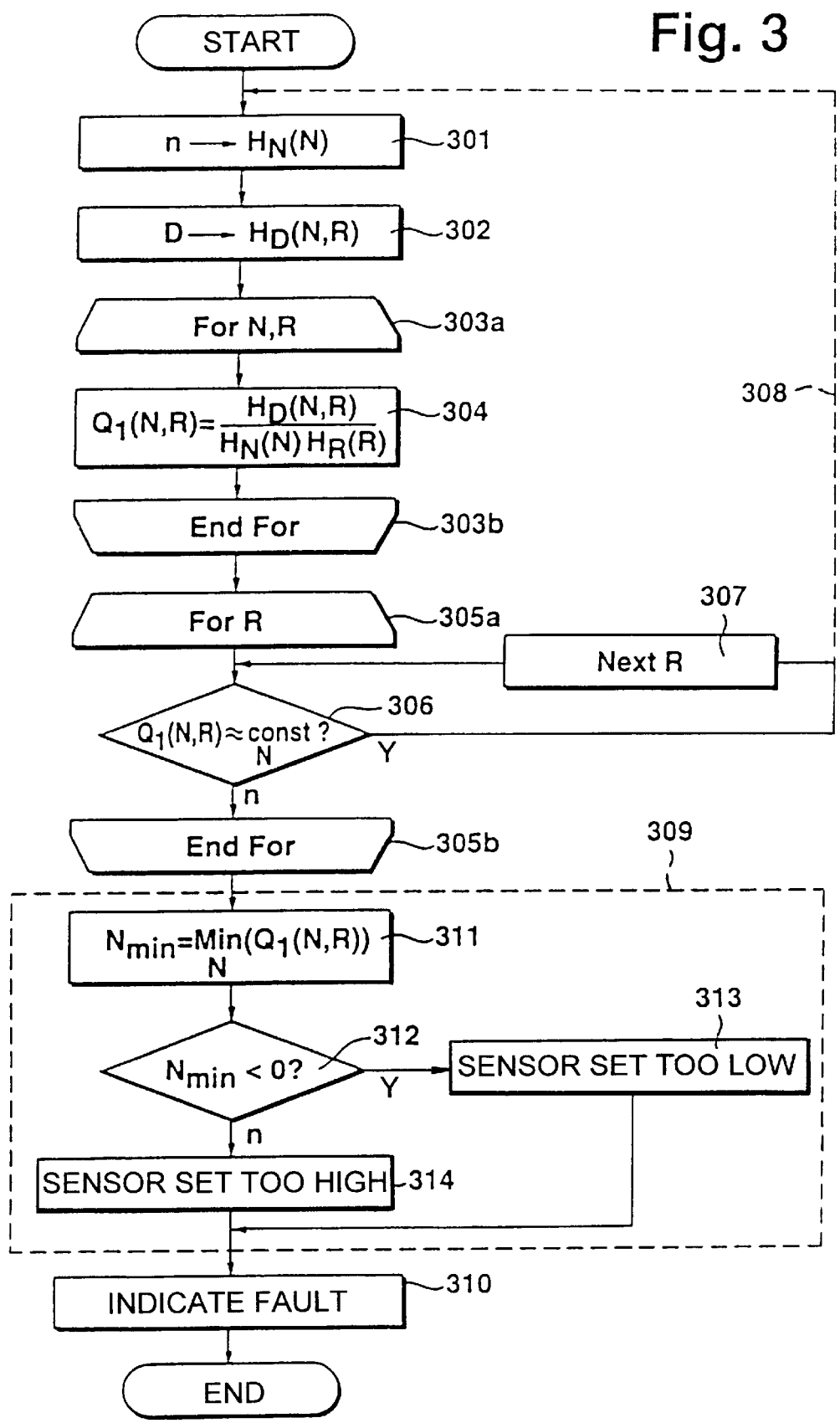
FIG. 3 shows a flow chart of a first exemplary embodiment of the present invention.

FIG. 3 shows a flow chart of a first exemplary embodiment of the method according to the present invention. According to a first block 301, pitch angles n are plotted on a distribution of pitch angle frequencies $H_N(N)$. This corresponds to the creation of a frequency distribution as shown in FIG. 2a. In the next step 302, target detections D are plotted on a combined frequency distribution $H_D(N,R)$ as shown in FIG. 2b. In blocks 303a and 303b, a loop is then initiated within which a quotient $Q_1(N,R)$ 304 is formed for each pitch angle interval N and for each distance interval R. This quotient $Q_1(N,R)$ is yielded preferably by the following equation:

$$Q_1(N,R)=H_D(N,R)/[H_N(N) \times H_R(R)]$$

where $H_D(N,R)$ is the total combined frequency distribution of target detections as shown in FIG. 2b;

$H_N(N)$ is the frequency distribution of the pitch angles as shown in FIG. 2a; and $H_R(R)$ is a total frequency of target detections D within the individual distance intervals R.

$H_R(R)$ standardizes the quotients $Q_1(N,R)$ to the total number of target detections D which occur within a distance cell R.

By means of these quotients $Q_1(N,R)$, the combined frequency distributions 22a to 22c are brought into a correlation with the frequency distribution of the pitch angles $H_N(N)$ 20. In accordance with a preferred embodiment of the present invention, this quotient is formed and analysis performed for each of distance cells R. Alternatively, however, the analysis can also be limited to one distance cell R, in which case the distance cell containing the greatest measurement range r is preferably chosen.

In blocks 305a and 305b another loop is then initiated, in which the quotient $Q_1(N,R)$ formed for each individual distance cell R is analyzed. The analysis is performed in step 306 by determining whether the quotient $Q_1(N,R)$ lies within a constancy interval IC for all N, i.e. whether the quotient $Q_1(N,R)$ is approximately constant over all pitch angle intervals N. As shown by block 307, this check is performed within each of the distance intervals R. Alternatively, according to dashed line 308, the analysis can also be limited to one distance interval, for example the one located farthest away.

If the constancy criterion is satisfied for the quotients $Q_1(N,R)$ for all pitch angle intervals N and for all the distance intervals R checked, it can be assumed that clearance sensor 11 is correctly aligned. This corresponds, with reference to FIGS. 2a and 2b, to a relationship of frequency distributions as shown, for example, at 20 and 22a. In such a case it is advisable to begin at 308 with another check cycle.

If, however, the quotient $Q_1(N,R)$ is not approximately constant over the pitch angle intervals N, it must be assumed that clearance sensor 11 is misadjusted or misaligned. In this case the method preferably branches to step 309, in which the direction of a vertical misadjustment of clearance sensor 11 is determined.

To do so, a search is initiated for the location of the lowest or least quotient or quotients $Q_1(N,R)$. This corresponds, in graphic terms, to a search for the beginning of the cross-hatched regions 24 and 25, i.e. a determination of the pitch angle at which the target detections D that would actually be expected are absent. Accordingly, in step 311 a determination is made of the pitch angle interval N at which quotient $Q_1(N,R)$ assumes its minimum value with respect to N. In step 312, a query is then used to branch the procedure, depending on whether the minimum is located at pitch angle intervals less than zero or pitch angle intervals greater than zero. If the minimum of the quotient $Q_1(N,R)$ is located, in accordance with 313, at pitch angle intervals less than zero, this indicates that clearance sensor 11 is set too low. In the opposite case, i.e. when the minimum of the quotient $Q_1(N,R)$ is located, in accordance with 314, at pitch angle intervals greater than zero, this indicates that clearance sensor 11 is set too high. The result of this analysis can, for example, be stored in a memory, so that it can be read out during a shop inspection, and can be used to correct the misadjustment of clearance sensor 11. In any case, in step 310 a fault indication is generated which, for example by means of a signaling device 14, warns a driver of the vehicle that a misadjustment or misalignment of the clearance sensor is present. Alternatively or additionally, this signal can also be used to switch clearance sensor 11 entirely or partially off, since its misadjustment or misalignment must be considered an operational failure.

Figure 4:
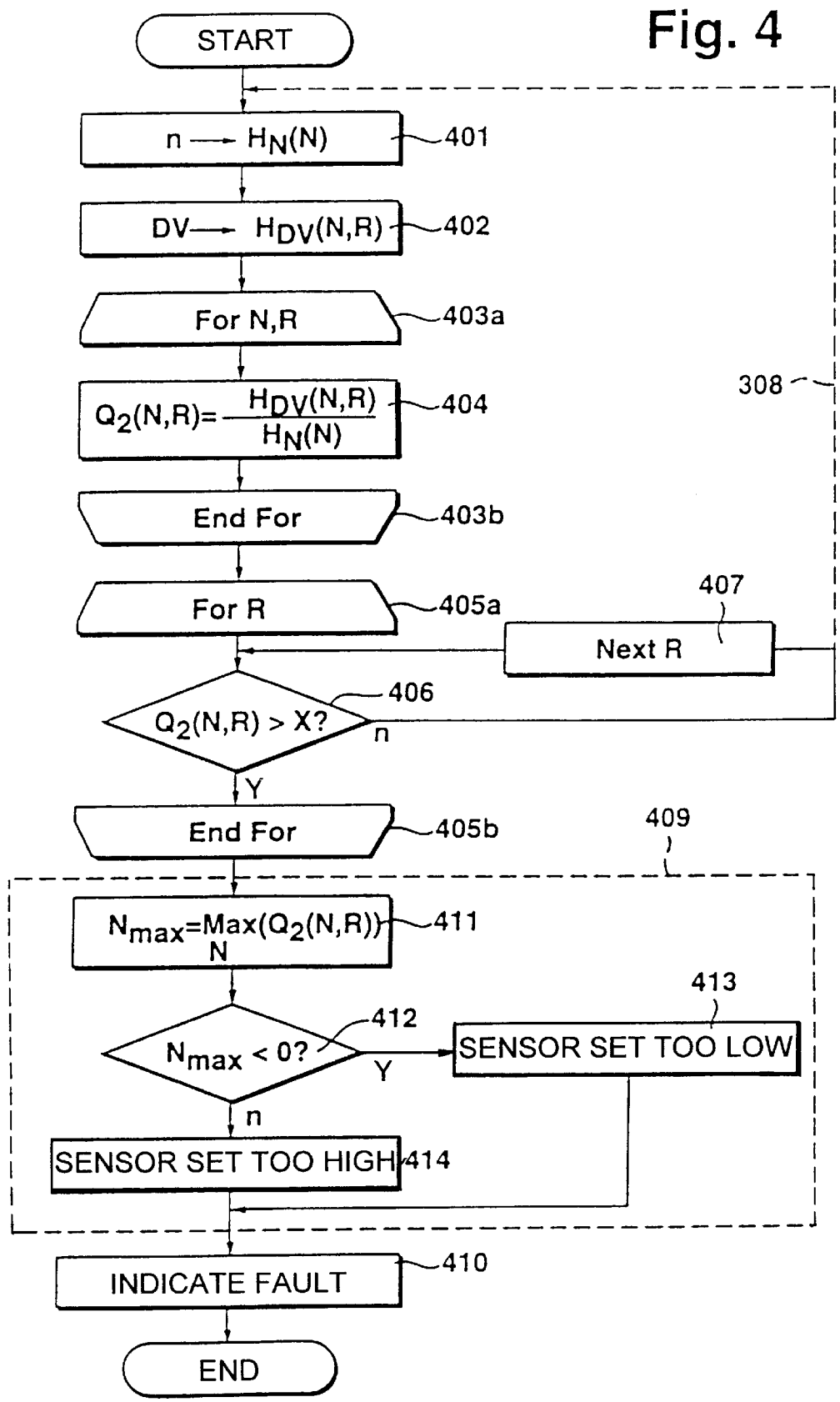
FIG. 4 shows a flow chart of a second exemplary embodiment of the present invention.

FIG. 4 shows a second alternative exemplary embodiment according to the present invention. In contrast to the first exemplary embodiment, a correlation is made between the pitch angle intervals N and target detection losses DV, instead of target detections D. This exemplary embodiment is thus complementary to the embodiment shown in FIG. 3. A target detection loss DV means, in this context, that a target which was once detected is suddenly no longer present in a subsequent measurement cycle. A target detection loss DV is thus recognized by comparing target detections D of a particular measurement cycle with those of the previous measurement cycle or cycles.

In a first step 401, a pitch angle frequency distribution $H_N(N)$ is created with reference to pitch angles n as in the first exemplary embodiment. In step 402, target detection losses DV are plotted on a combined frequency distribution $H_{DV}(N,R)$. This combined frequency distribution $H_{DV}(N,R)$ corresponds structurally to the distribution shown in FIG. 2b, except that target detection losses DV are plotted instead of target detections D. The consequence is that different specific profiles result for the individual frequency distributions 22a to 22c. In a loop 403a and 403b, a quotient $Q_2(N,R)$ is once again formed within each distance cell R in order to analyze the correlation, and this quotient contains at least the frequency distribution $H_{DV}(N,R)$ of the target detection losses DV and the frequency distribution of the pitch angles $H_N(N)$. As was the case in the exemplary embodiment shown in FIG. 3, the analysis can, as an alternative, be limited to one distance interval R, preferably the one located farthest away.

In the subsequent loop 405a and 405b, the quotient $Q_2(N,R)$ is then analyzed. Since said quotient $Q_2(N,R)$ contains the target detection losses DV with reference to pitch angles, the analysis involves checking whether those target detection losses DV occur particularly often at individual pitch angle intervals N. This is done, according to 406, by comparing the quotient $Q_2(N,R)$ with a threshold value X. This threshold value X must be selected appropriately on the basis of data derived from experience. If the quotient $Q_2(N,R)$ for all N lies below the threshold value X, this means that only a permissible number of target detection losses DV is occurring. This can result, for example, from statistical fluctuations in the general operation of clearance sensor 11. In block 407, this query is performed for all distance cells R. Alternatively, as mentioned earlier and described in 408, the query can be limited to one distance cell.

If the quotient $Q_2(N,R)$ for individual or multiple pitch angle intervals N is greater than the established threshold value X, it must in turn be assumed that clearance sensor 11 is misadjusted or misaligned. In this case, as shown by 409, an analysis of the combined frequency distribution $H_{DV}(N,R)$ with respect to the direction of the misalignment must be performed. This is done in a manner comparable to block 309 of FIG. 3. In contrast to the procedure therein, however, here (in 411) a maximum of the quotient $Q_2(N,R)$ is first determined. At 412, there are execution branches depending on whether that maximum is located at pitch angle intervals less than or greater than zero. In the first case (413), clearance sensor 11 is set too low, since given this position of the maximum, most target detection losses DV occur at negative pitch angles, i.e. when the front springs of vehicle 10 are compressed. In the second case (414), clearance sensor 11 is set too high, since here most target detection losses occur at positive pitch angles, i.e. when the front springs of vehicle 10 are extended.

At 410, in the event of a misadjustment, a fault indication is once again provided and clearance sensor 11 is alternatively or additionally switched off.

A combination of the two exemplary embodiments, either with one another or with other known methods for checking the operation of a clearance sensor, is preferred. With regard to a decision as to the existence of a vertical misalignment and also with respect to its particular direction, it may then, in that context or also within the methods of the individual exemplifying embodiments, be advisable to arrive at a majority decision if the various individual indicators would lead to different results.

What is claimed is:

1. A method for recognizing a vertical misalignment of a clearance sensor mounted to a motor vehicle, the method comprising the steps of:

determining a plurality of pitch angles of the motor vehicle;

determining a frequency of target occurrences, the target occurrences including at least one of an occurrence in which the clearance sensor detects a target and an occurrence in which the clearance sensor detects a target in one cycle but does not detect the target in a subsequent cycle;

determining a correlation between the plurality of pitch angles to the frequency of target occurrences;

determining a fault indicator as a function of the correlation; and recognizing the vertical misalignment as a function of the fault indicator.

2. The method according to claim 1, wherein the clearance sensor is a radar sensor.

3. The method according to claim 1, wherein determining the correlation includes the steps of:

determining a frequency of pitch angle occurrences for each one of the plurality of pitch angles;

grouping the frequency of pitch angle occurrences into a predetermined plurality of pitch angle intervals, each pitch angle interval containing all frequency of pitch angle occurrences within a predetermined range of pitch angles;

grouping the frequency of target occurrences according to the plurality of pitch angle intervals, wherein at least one target occurrence that occurred at a first pitch angle within a pitch angle interval is grouped with any other target occurrences that occurred at a pitch angle within the same pitch angle interval; and determining a frequency of target occurrences within each pitch interval of the plurality of pitch angle intervals, wherein the correlation between the plurality of pitch angles to the frequency of target occurrences is determined using the frequency of pitch angle occurrences within a pitch angle interval and the frequency of target occurrences within the same pitch angle interval.

4. The method according to claim 1, wherein determining the correlation includes the steps of:

determining a corresponding plurality of distances for the plurality of target occurrences included in the frequency of target occurrences, each distance corresponding to a distance between the target and the clearance sensor for each target occurrence;

grouping the plurality of distances into a predetermined plurality of distance intervals;

grouping the frequency of target occurrences according to the plurality of distance intervals, wherein at least one target occurrence that was detected at a distance within a distance interval is grouped with other target occurrences that were detected at the same distance interval; and determining a frequency of target occurrences within each distance interval of the plurality of distance intervals, wherein the correlation is determined between the plurality of pitch angles and the frequency of target occurrences within each distance interval.

5. The method according to claim 1, wherein determining the correlation includes the steps of:

determining a frequency of pitch angle occurrences for each one of the plurality of pitch angles;

grouping the frequency of pitch angle occurrences into a predetermined plurality of pitch angle intervals, each pitch angle interval containing all frequency of pitch angle occurrences within a predetermined range of pitch angles;

determining a plurality of distances for all of the target occurrences in the frequency of target occurrences, each distance corresponding to the distance between the target and the clearance sensor for each target occurrence;

grouping the plurality of distances into a predetermined plurality of distance intervals;

grouping the frequency of target occurrences according to the plurality of pitch angle intervals and the plurality of distance intervals, wherein at least one target occurrence that was detected at a pitch angle and a distance is grouped with other target occurrences that occurred at the same pitch angle and the same distance, the target occurrences limited to those target occurrences in which a target was detected by the clearance sensor;

determining a frequency of target occurrences within each distance interval of the plurality of distance intervals and a corresponding pitch angle of the plurality of pitch angle intervals;

forming at least one quotient, the at least one quotient relating the frequency of target occurrences within each distance interval of the plurality of distance intervals and a corresponding pitch angle of the plurality of pitch angle intervals to a frequency of pitch angle occurrences within a corresponding pitch angle interval; and analyzing a relationship between the at least one quotient and the corresponding pitch angle interval.

6. The method according to claim 5, wherein analyzing the relationship between the at least one quotient and the corresponding pitch angle interval includes the step of assuming the vertical misalignment of the clearance sensor if the at least one quotient deviates from a predetermined range.

7. The method according to claim 5, wherein analyzing the relationship between the at least one quotient and the corresponding pitch angle interval includes the step of determining a minimum quotient of the at least one quotient and the corresponding pitch angle interval, and wherein the corresponding pitch angle interval is used to determine a direction of the misalignment.

8. The method according to claim 5, wherein the analysis of the relationship between the at least one quotient and the corresponding pitch angle interval is performed only for a maximum distance interval.

9. The method according to claim 1, wherein determining the correlation includes the steps of:

determining a frequency of pitch angle occurrences for each one of the plurality of pitch angles;

grouping the frequency of pitch angle occurrences into a predetermined plurality of pitch angle intervals, each pitch angle interval containing all frequency of pitch angle occurrences within a predetermined range of pitch angles;

determining a plurality of distances for all of the target occurrences in the frequency of target occurrences, each distance corresponding to the distance between the target and the clearance sensor for each target occurrence;

grouping the plurality of distances into a predetermined plurality of distance intervals;

grouping the frequency of target occurrences according to the plurality of pitch angle intervals and the plurality of distance intervals, wherein at least one target occurrence that was detected at a pitch angle and a distance is grouped with other target occurrences that occurred at the same pitch angle and the same distance, the target occurrences limited to those target occurrences in which the clearance sensor detected a target in one cycle but not in a subsequent cycle;

determining a frequency of target occurrences within each distance interval of the plurality of distance intervals and a corresponding pitch angle of the plurality of pitch angle intervals;

forming at least one quotient, the at least one quotient relating the frequency of target occurrences within each distance interval of the plurality of distance intervals and a corresponding pitch angle of the plurality of pitch angle intervals to a frequency of pitch angle occurrences within a corresponding pitch angle interval;

comparing the at least one quotient to a predetermined threshold value; and assuming the vertical misalignment of the clearance sensor if the at least one quotient is greater than the predetermined threshold value for the corresponding pitch angle interval.

10. The method according to claim 9, wherein the comparison of the at least one quotient to the predetermined threshold value is performed only for a maximum distance interval.

11. An apparatus for recognizing a vertical misalignment of a clearance sensor mounted to a motor vehicle, comprising:

means for determining a plurality of pitch angles of the motor vehicle;

means for determining a frequency of target occurrences, the target occurrences including at least one of an occurrence in which the clearance sensor detects a target and an occurrence in which the clearance sensor detects a target in one cycle but does not detect the target in a subsequent cycle;

means for determining a correlation between the plurality of pitch angles to the frequency of target occurrences;

means for determining a fault indicator as a function of the correlation; and means for recognizing the vertical misalignment as a function of the fault indicator.

* * * * *